United States Patent
Kata et al.

(10) Patent No.: US 7,226,341 B2
(45) Date of Patent: Jun. 5, 2007

(54) METHOD OF MANUFACTURING LAMINATED MOLD AND LAMINATED MOLD

(75) Inventors: Takehiro Kata, Tokyo (JP); Yuichiro Ogawa, Tokyo (JP); Gyoei Iwamoto, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 95 days.

(21) Appl. No.: 10/518,017

(22) PCT Filed: Jul. 1, 2003

(86) PCT No.: PCT/JP03/08342

§ 371 (c)(1),
(2), (4) Date: Dec. 14, 2004

(87) PCT Pub. No.: WO2004/002707

PCT Pub. Date: Jan. 8, 2004

(65) Prior Publication Data

US 2005/0249832 A1 Nov. 10, 2005

(30) Foreign Application Priority Data

Jul. 1, 2002 (JP) .................... 2002-191827
Jul. 8, 2002 (JP) .................... 2002-198586

(51) Int. Cl.
*B29C 35/02* (2006.01)

(52) U.S. Cl. .................... 451/38; 451/41; 451/56; 264/315

(58) Field of Classification Search .................... 451/38, 451/41, 56, 57; 425/39, 47, 812, 46; 264/315, 264/326

See application file for complete search history.

(56) References Cited

U.S. PATENT DOCUMENTS

| | | | | |
|---|---|---|---|---|
| 4,057,446 A | * | 11/1977 | Goodfellow | 156/123 |
| 5,382,402 A | * | 1/1995 | Espie et al. | 264/326 |
| 5,512,006 A | * | 4/1996 | Wood et al. | 451/39 |
| 5,798,076 A | * | 8/1998 | Ladouce | 264/326 |
| 5,980,810 A | * | 11/1999 | Ladouce | 264/326 |

* cited by examiner

*Primary Examiner*—Lee D. Wilson
*Assistant Examiner*—Anthony Ojini
(74) *Attorney, Agent, or Firm*—Oliff & Berridge, PLC (57) ABSTRACT

For manufacturing the laminated mold comprising the laminate (11) being formed of a plurality of thin sheets (11a) laminated on each other, laminate the thin sheets with the excess portions of respective thin sheets exceeding the profile of the tire crown portion on the side of contacting with the tire stepping face left, then remove the excess portions, form the sector mold by placing the laminate (11) with the excess portions removed in the holder, form the laminated mold having the annular read pattern by arranging a plurality of the sector mold in a peripheral direction of the tire so as to suppress formation of the stepped shape appearing on the tire profile comparing with the one as originally intended.

8 Claims, 6 Drawing Sheets

METHOD OF MANUFACTURING LAMINATED MOLD AND LAMINATED MOLD

BACKGROUND OF THE INVENTION

1. Field of the Invention

Present invention relates to a manufacturing method of a tire mold for molding a tire with vulcanization and specifically related to the laminated mold provided with a laminate consisting of a plurality of thin sheets laminated on each other in a widthwise direction and a manufacturing method thereof.

2. Description of the Prior Art

Figure 8A:
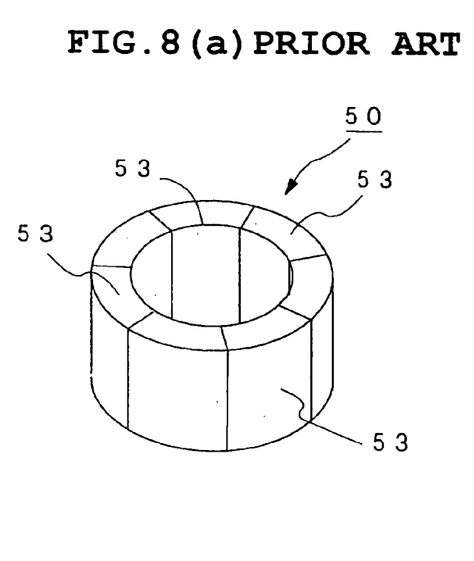
FIG. 8(a) and FIG. 8(b) show a schematic diagram of a vulcanization metal mold of the prior art.
Figure 8B:
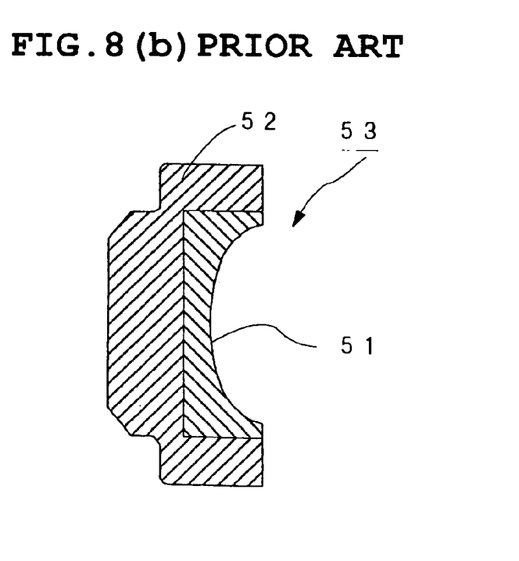
Figures 9A, 9B:
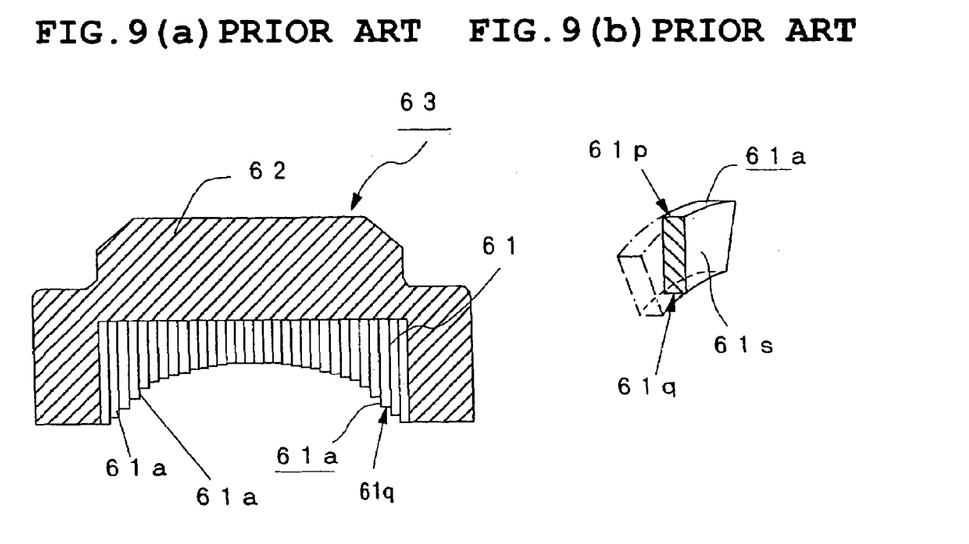
FIG. 9(a) and FIG. 9(b) show a schematic diagram of a laminated mold of the prior art.

As shown by FIG. 8(a) and FIG. 8(b), so far has been used a vulcanization metal mold (50) comprising a plurality of sector molds (53) annularly coupled each of which is formed of a holder (52) by which a crown portion metal mold (51) having a cross sectional shape of the tire crown portion is held and the surface of a raw tire being already molded is press fit to an inner wall of the heated vulcanization mold (50) by pressurizing inner side of the molded tire and such application of heat and pressure to raw rubber has been employed as a method of vulcanization of tire. Usually, the above crown portion metal mold (51) can be manufactured by casting and yet, because such a casting mold not only costs much labor but also material cost is high, recently for meeting purpose of attaining low cost and reduction in delivery date in place of the above crown portion metal mold (51), which is a casting mold, a laminated mold as shown by FIG. 9(a) and FIG. 9(b) has become in use wherein the laminated mold comprises an annular tread pattern molding portion being formed by arranging a plurality of sector molds (63) in a peripheral direction of the tire wherein the crown portion metal mold (61) which consists of the laminate being formed of a plurality of thin sheets laminated, held by the holder (62) constitutes the sector mold (63). In this description (61s) denotes a lamination surface of the thin sheet (61), (61p) denotes an end face of the thin sheet on the side of the holder (62) and (61q) denotes an end face of the thin sheet on the side of contacting with the face of the tire stepping on the road surface (hereinafter, the wording "the face of the tire stepping on the road surface" is shortened to read "the tire stepping face").

Figure 10:
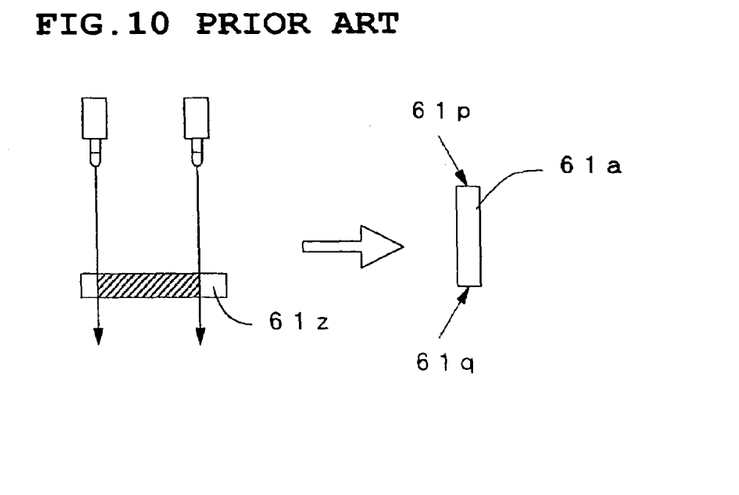
FIG. 10 shows a working process for forming a thin sheet of the prior art.

In view of automating and speeding up the manufacturing, the thin sheet (61a) is generally formed by means of a laser machining with 2DCAM. Thus formed thin sheets (61a) are laminated to form the laminate to be used as the crown portion metal mold (61) and by placing the crown portion metal mold (61) in the holder (62), the sector mold (63) having the laminate as the crown portion metal mold can be formed. Concretely speaking, as shown by FIG. 10 the thin sheet materials (61z) are cut at respective both ends by casting a laser beam perpendicularly to those thin sheet materials (61z) to become rectangularly shaped cross section and those thin sheet (61a) having thus formed rectangularly shaped cross section are laminated in a widthwise direction of the tire to form the tread pattern molding portion.

However, as long as relying on the above method, as shown by FIG. 9(a) due to the fact that the cross section of the thin sheet (61a) is rectangularly shaped, the crown portion metal mold (61), which is formed by coupling end faces (61q) of respective thin sheets (61a), inevitably becomes to have a profile stepped by the amount corresponding to the thickness of the thin sheets (61a) having the rectangularly shaped cross section. Accordingly, there have arisen problems such that not only appearance of the vulcanized tire is inferior but also its performance is inferior than that of the vulcanized tire manufactured through the casting mold currently in use. Furthermore, possibility of degradation in durability is anticipated because many protrusions with acute angle appear on the tire stepping face.

Further, in the case where the thin sheets are laminated in a peripheral direction of the tire, though close contact between those thin sheets can be assured on the inner side of radial direction, but on the outer side thereof gaps are inevitably produced therebetween and not only opening and closing operation of the mold becomes unstable but also degradation in its durability will be caused.

The present invention is made to cope with those problems so far have arisen and thus object of the present invention to provide a method for manufacturing the laminated mold capable of suppressing formation of stepped shape appearing on its profile comparing with the one as originally intended.

SUMMARY OF THE INVENTION

The invention of the second aspect provides the manufacturing method of the laminated mold comprising the laminate being formed of a plurality of thin sheets laminated in a widthwise direction or in a peripheral direction of the tire, and the manufacturing method is characterized in comprising the steps of laminating those thin sheets under the condition that the excess portions of them, which exceed the shape of the tire crown portion, are left on the side contacting with the tire stepping face, and after proceeding the lamination step removal of the excess portions is carried out by means of a shot blast. By virtue of such a process, the profile of the laminated mold on the side of the tire stepping side can be formed quite the same with that of the tire as originally intended, and as a result the tire, which has both of the profile and the performance equivalent to those obtained through the casting mold currently in use, can become to be realizable easily. It is noted that, though the profile of the tire crown portion as given above is generally meant by that which is taken in a widthwise direction but nevertheless the present invention also includes the profile taken in a peripheral direction of the tire crown portion such as change in depth of grooves in a peripheral direction of the tire.

The manufacturing method of the laminated mold according to the invention of the third aspect is characterized in that the material to be injected (hereinafter "the material to be injected" shortened to read "injection material") according to the invention of the second aspect is limited to aluminum powder.

The manufacturing method of the laminated mold according to the invention of the fourth aspect characterized in that removal of the excess portions according to the second aspect or the third aspect is carried out after masking boundary portions of respective thin sheets.

The invention of the fifth aspect provides the manufacturing method of the laminated mold comprising the laminate being formed of a plurality of thin sheets laminated in a widthwise direction or in a peripheral direction of the tire, wherein those thin sheets on the side of the tire stepping face are tapered in advance so as to bring those tapered portion thereof to have the taper angle approximately equal to the angle corresponding to that of the profile of the crown portion and after tapering them those tapered thin sheets are laminated. Through this process of manufacturing method, by a simple machining the profile of the laminated mold on the side of the tire stepping face can be approximated to the one as originally intended.

The manufacturing method of the laminated mold according to the invention of the sixth aspect, the tapering work according to the fifth aspect is carried out by a laser machining.

The manufacturing method of the laminated mold according to the invention of the seventh aspect the tapering work according to the fifth aspect is carried out by means of a shot blast.

The manufacturing method of the laminated mold according to the invention of the eighth aspect is characterized in that when laminating a plurality of thin sheets in a peripheral direction of the tire according either one of the first through seventh aspect, bumps are provided on respective lamination surfaces of thin sheets in a thicknesswise direction thereof, those thin sheets are caused to mutually abut therebetween in a lamination direction through those bumps so as to secure those thin sheets with a fixed spacing, enabling to secure them in a close contact therebetween, thereby stabilizing opening and closing operation of the mold and also improving the durability of the mold further.

The invention of the ninth aspect provides the laminated mold comprising the laminate being formed of a plurality of thin sheets laminated in a widthwise direction of the tire characterized in that bumps are provided on the lamination surfaces of respective thin sheets protruding in a thicknesswise thereof so that those thin sheets are caused to mutually abut in a laminationwise direction, there by securing those thin sheets with a fixed spacing.

The laminated mold according to the invention of the tenth aspect characterized in that the bumps provided on respective thin sheets according to the ninth aspect are formed by a press work.

The laminated mold according to the eleventh aspect characterized in that the thickness of the thin sheets according to the ninth or tenth aspect is limited to fall in the arrange of 0.1~3 mm.

DETAILED DESCRIPTION OF THE PREFERRED EMBODIMENT

A preferred embodiment of the present invention will be described herein under with reference to the accompanying drawings.

Figure 1:
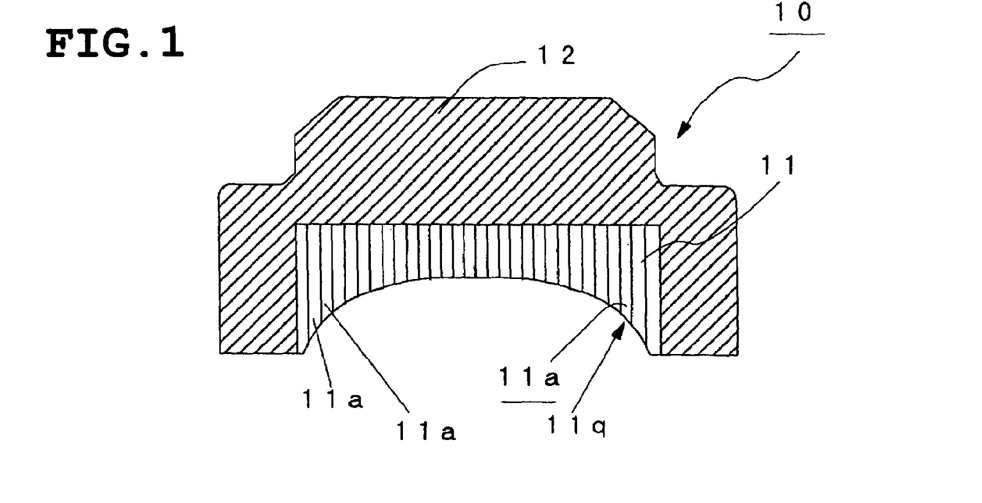
FIG. 1 shows a constitution of the sector mold used for the laminated mold presented in the most preferable Embodiment 1 of the present invention.
Figures 2A, 2B:
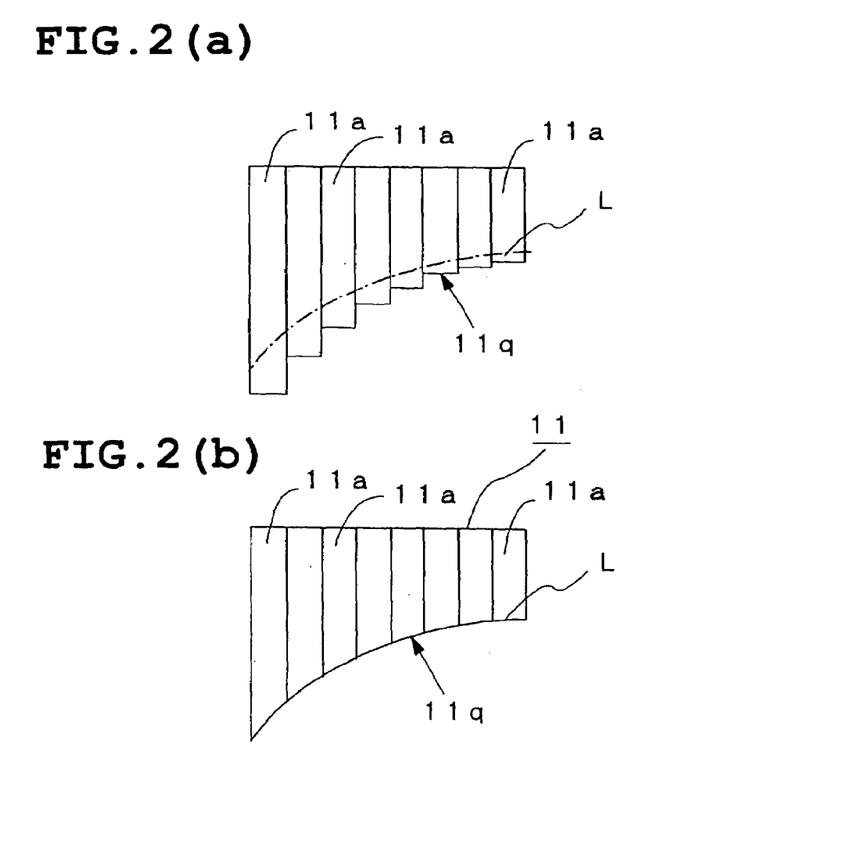
FIG. 2(a) and FIG. 2(b) shows a working process for forming the laminate presented in the most preferable Embodiment 1 of the present invention.

FIG. 1 shows a constitution of the sector mold (10) used for the laminated mold exemplified in the most preferable Embodiment 1 and in this drawing the reference numeral (11) denotes the laminate (crown portion metal mold) consisting of a plurality of thin sheets (11a) laminated in a widthwise direction of the tire, (12) denotes the sector holder (hereinafter named as "holder") for holding the laminate (11) therein. In this Embodiment, when forming the laminate (11) as shown by FIG. 2(a) those thin sheets (11a) are laminated under the condition that the excess portions, which is the portion exceeding the profile of the tire crown portion (tire profile) as denoted by the line L, are left to the end face (11q) of respective thin sheets (11a) on the side contacting with the tire stepping face, and after those thin sheets have been laminated, as shown by FIG. 2(b) the excess portions are removed by means of a machining so as to reduce the profile of the mold on the side of the tire stepping face to the tire profile L as originally intended. By virtue of this process, profile of the laminate (11) of the tire stepping face, which so far has been obliged to exhibit the shape stepped by the level difference corresponding to the thickness of the respective thin sheets (11a), can be reduced to a smooth shape quite the same with that of a casting mold currently in use.

Accordingly, as shown by FIG. 1, by arranging a plurality of sector molds (10), which is formed by arranging the crown portion metal mold consisting of the laminate (11) held in the holder (12), in a peripheral direction of the tire, the laminated mold having the annular tread pattern mold can be formed. The vulcanized tire obtained through thus formed laminated mold is now released from exhibiting the appearance of stepped shape resulting in that the tire having the same performance with the one which is vulcanized through the casting mold currently in use is available with low cost and in a shortened period.

Figure 3A:
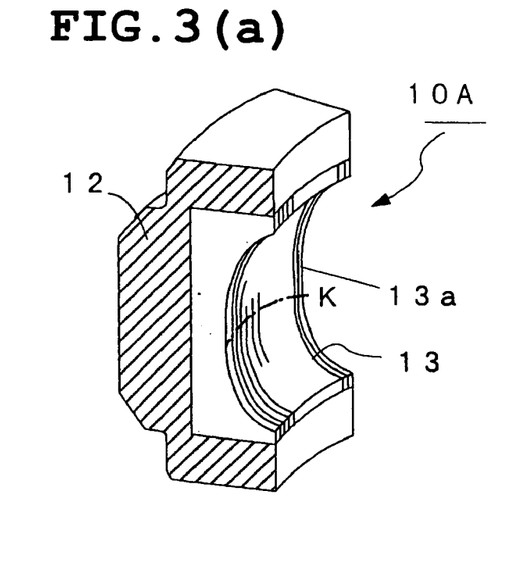
FIG. 3(a) and FIG. 3(b) show another example of constitution of the sector mold used for the laminated mold of the present invention.
Figure 3B:
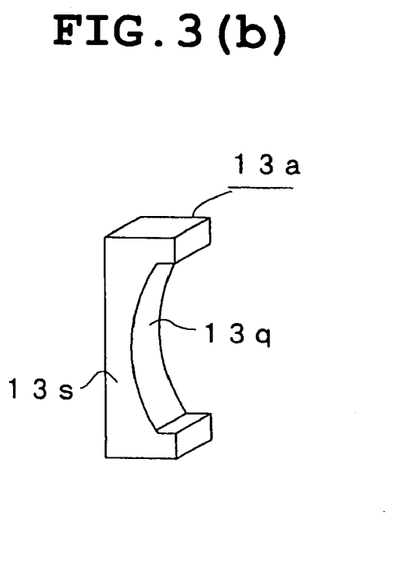
Figure 4A:
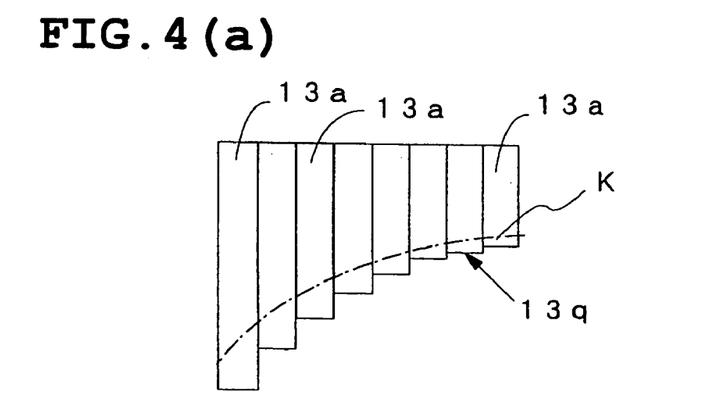
FIG. 4(a) and FIG. 4(b) show a working process for forming the thin sheets used for the laminated mold as given in FIG. 3.
Figure 4B:
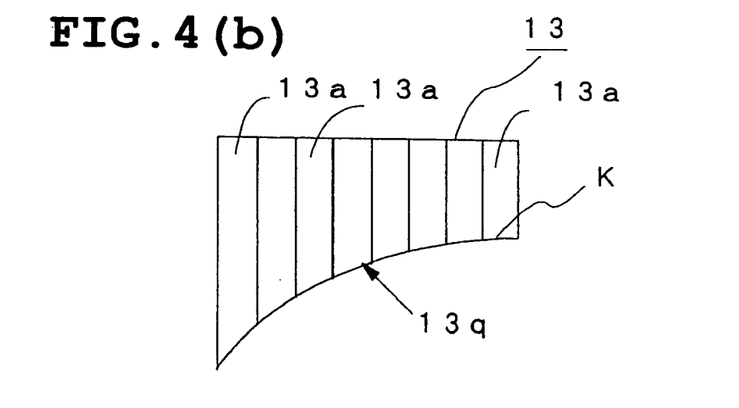

In the most preferable Embodiment 1 as above, though description was made in the case where a plurality of thin sheets (11a) are laminated in a widthwise direction of the tire and nevertheless as shown by FIG. 3(a) and FIG. 3(b) the present invention is also applicable to manufacture the sector mold (10A) comprising the holder (12) for holding the laminate (13) being formed of a plurality of thin sheets (13a) laminated in a peripheral direction of the tire. In this case, as shown by FIG. 4(a), the thin sheets (13a) are laminated under the condition that the excess portions, appearing at an end face (13q) of respective thin sheets (13a) on the side of the tire stepping face are left taking account of the profile taken in a peripheral direction of the tire as denoted by K such as change in depth of grooves of the tire in its peripheral direction, and as shown by FIG. 4(b) after proceeding the lamination the excess portions are removed by a machining work so that the profile of the mold on the side of the tire stepping face become the same with that which is originally intended.

Figure 5A:
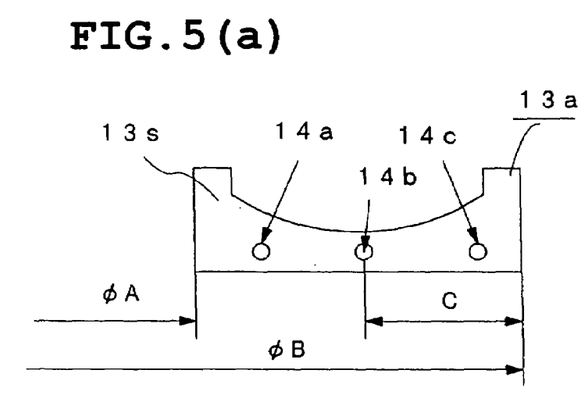
FIG. 5(a), FIG. 5(b) and FIG. 5(c) show a method of laminating thin sheets having bumps according to the present invention.
Figure 5B:
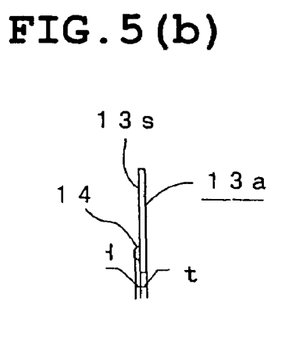
Figure 5C:
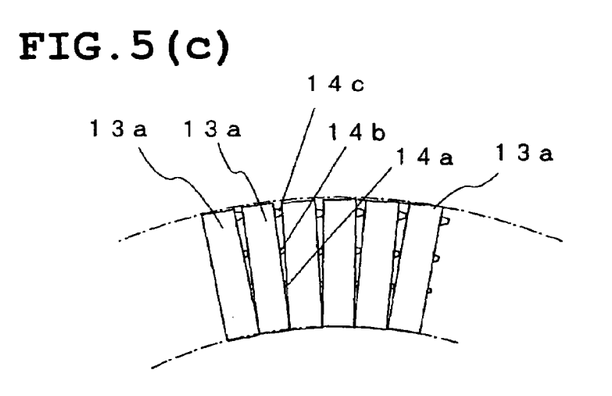

It is noted that, in the case where a plurality of the thin sheets (13a) are laminated in a peripheral direction of the tire, though on the inner side of a radial direction, i.e. on the side of the tire stepping face respective thin sheets (13a)

contact closely as shown by FIG. 5(a) and FIG. 5(b), but on the outer side as thereof shown by FIG. 5(c) gaps are obliged to be produced. To cope with this situation, it is preferable to provide a plurality of bumps (14a, 14b, 14c) protruding in a thicknesswise direction of respective thin sheets (13a) on their respective lamination surfaces (13s) and as shown by FIG. 5(c) arrange those the thin sheets (13a) to cause to mutually abut in a laminationwise direction between those thin sheets, so as to secure a fixed spacing therebetween. As a result, close contact between those thin sheets (13a) can be made securely and opening and closing operation of the mold can be stabilized and also durability of the mold can be improved.

As to the foregoing structure, it is quite natural that the amount of the protrusion (14) of the bumps are set higher as they go outwardly of radial direction. Concretely speaking, amount of the protrusion H is given by the formula 1, wherein A denotes radius of the thin sheet (13a) up to the inner end in radial direction, B denotes radius of the thin sheets (13a) up to the outer end in radial direction, C denotes the dimension covering the distance from outer end of the thin sheet (13a) in a radial direction to the bump (14) and t denotes the thickness of the thin sheet. Thus, Formula (1) is given as, $$\text{Protrusion height } H = \{\pi(B-2C) - \pi A\}/(\pi A/t) \qquad (1)$$

It is noted that provision of forming bumps (14) on the thin sheets (13a) can be easily made by means of applying a press molding to the metal sheet. In view of workability, thickness of the above metal sheet (the shin sheet (13a)) is preferably chosen to fall in the range of 0.1~3 mm when the thin sheet is formed by means of a press molding.

Figure 6A:
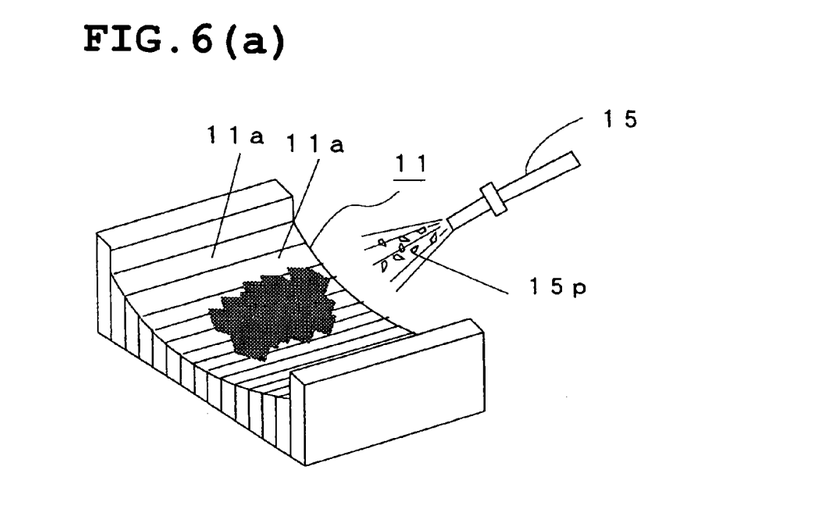
FIG. 6(a) and FIG. 6(b) show another example of working process for forming the laminate according to the present invention.

In the above example, though description was made in the case of removing the excess portions by means of a machine work, and yet other means such as a laser machining or a shot blast can be applicable to perform such a removal of the excess portions and this is done as shown by FIG. 6(a) such that compressed air, which is mixed with an injection material in a state of minute particles (15p) such as abrasive sand, is forcibly sent and is blasted on to the surface of the laminate (11) through a nozzle (15), thereby polishing the inside surface of the laminate. The materials to be sprayed are chosen depending on the material to be polished and attached material among various materials such as fragments of metals such as iron, copper, zinc, and aluminum and glass beads and ceramic powder. Among them, ceramic powder having minute diameter of particles and high hardness is preferable and still use of aluminum powder is specifically preferred.

Figure 6B:
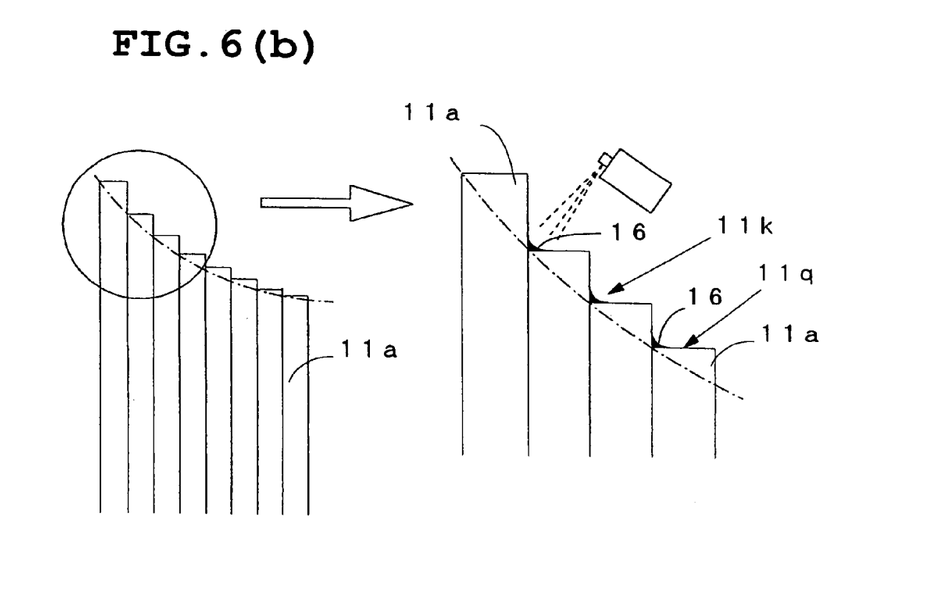

As shown by FIG. 6(b) prior to perform the shot blast, it is preferable to coat the stepped valley portion (11k) which is a boundary portion between those thin sheets (11a), with a removable masking material (16) by peeling off such as vinyl chloride by spraying the above material to that portion (11k) and after that it is preferable to polish them by a shot blast. In this manner after performing the shot blast profile of the laminate on the side of the tire stepping face can be reduced certainly to a smoothly finished surface being the same with that which is obtained by means of casting mold currently in use. Furthermore, by performing the above mentioned masking the thin sheets (11a) are protected from entering of sprayed powder and fragments into minute gaps between those thin sheets (11a) and in turn those minute gaps therebetween can be alive, thereby securing the passages for releasing air through those gaps during the mold being proceeded.

The Most Preferable Embodiment 2

Figure 7A:
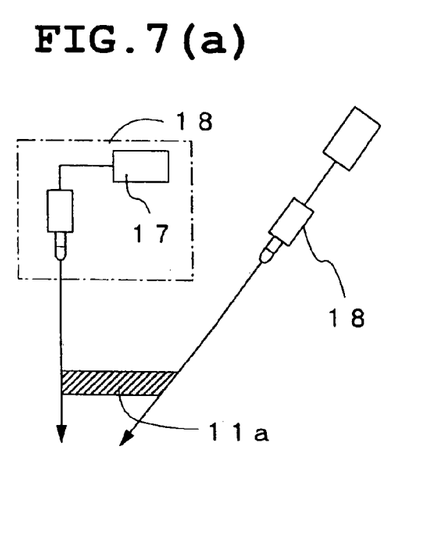
FIG. 7(a) and FIG. 7(b) show a working process for forming the thin sheets presented in the most preferable Embodiment 2.
Figure 7B:
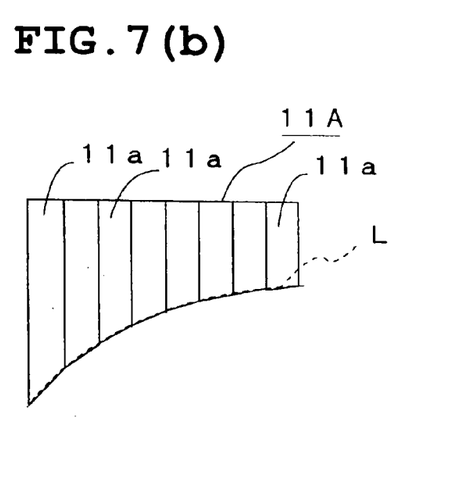

Though in the Embodiment 1, the profile of the mold on the side of the tire stepping face was reduced to the shape quite the same with that which is denoted by L obtained by removing the excess portions by a mechanical work after laminating those thin sheets (11a) with those excess portions left thereto, and still other than the foregoing as shown by FIG. 7(a) a laser work can be applicable such that the laminate (crown portion metal mold) (11A) consisting of thin sheets (11a) laminated can also be formed in such a manner that firstly the thin sheets (11a) to be laminated on the side of contacting with the tire stepping face are tapered by means of a laser machining device (18) having a laser generator (17) so as to make the angle essentially the same with the angle corresponding to the profile of the crown portion, and after that those thin sheets (11a) which have been thus tapered, are laminated to form the laminate (11A). In this manner, as shown by FIG. 7(b) by a simple working, profile of the mold on the side of the tire stepping face can be approximated to the tire profile L as originally intended. In this example, profile of the laminate (11A) on the side of the tire stepping face becomes to the shape as shown by the broken line and this manifests that, if the condition that thickness and number of thin sheets (11a) to be laminated are properly set, the vulcanized tire can be reduced to a sufficiently smooth form. It is noted that the foregoing tapering work is not limited to the laser machining but other means such as mechanical machining and shot blast can be applicable.

INDUSTRIAL FEASIBILITY

As hitherto mentioned, according to the present invention when manufacturing the laminated mold either one of procedures can be employed: first, thin sheets are laminated under the condition that excess portions of respective thin sheets on the side of the tire stepping face, namely the portions exceeding the profile of the tire crown portion, are left and after the lamination proceeded those excess portions are removed, or alternatively, the thin sheets on the side of the tire stepping face are tapered in advance so that the tapered portions exhibit substantially the same angle that which corresponds to the profile of the tire crown portion and after this tapering work those thin sheets are laminated and thus the profile of the laminated mold on the side of the tire stepping face can be made the same with or approximately the same with the profile as originally intended. In this manner, the tire having the same profile with that which so far has been manufacture by means of the casting mold currently in use can be realized with low cost and in a shortened period.

What is claimed is:

1. A manufacturing method of a laminated mold comprising a laminate being formed by laminating a plurality of thin sheets in a widthwise direction or in a peripheral direction of a tire comprising the steps of, laminating the thin sheets having rectangular cross section so as to bring the thin sheets on the side of contacting with a tire stepping face to be placed along a profile of a tire crown portion, and after laminating the thin sheets, excess portions of respective thin sheets exceeding the profile of the tire crown portion are removed by means of a shot blast.

2. The manufacturing method of the laminated mold according to claim 1, characterized in that aluminum powder is used as the material to be injected.

3. The manufacturing method of the laminated mold according to claim 2 characterized in that, after masking boundary portions of respective thin sheets, removal of the excess portions is performed by means of blasting.

4. The manufacturing method of the laminated mold according to claim 2, when laminating a plurality of the thin sheets in a peripheral direction of the tire comprising the steps of, providing bumps on lamination surfaces of respective thin sheet in a thicknesswise thereof so that the thin sheets are caused to mutually abut in a laminationwise direction through the bumps so as to fix spacing between the thin sheets.

5. The manufacturing method of the laminated mold according to claim 1 characterized in that, after masking boundary portions of respective thin sheets, removal of the excess portions is performed by means of blasting.

6. The manufacturing method of the laminated mold according to claim 5, when laminating a plurality of the thin sheets in a peripheral direction of the tire comprising the steps of, providing bumps on lamination surfaces of respective thin sheet in a thicknesswise thereof so that the thin sheets are caused to mutually abut in a laminationwise direction through the bumps so as to fix spacing between the thin sheets.

7. The manufacturing method of the laminated mold according to claim 1, when laminating a plurality of the thin sheets in a peripheral direction of the tire comprising the steps of, providing bumps on lamination surfaces of respective thin sheet in a thicknesswise thereof so that the thin sheets are caused to mutually abut in a laminationwise direction through the bumps so as to fix spacing between the thin sheets.

8. The manufacturing method of the laminated mold according to claim 1, when laminating a plurality of the thin sheets in a peripheral direction of the tire comprising the steps of, providing bumps on lamination surfaces of respective thin sheet in a thicknesswise thereof so that the thin sheets are caused to mutually abut in a laminationwise direction through the bumps so as to fix spacing between the thin sheets.

* * * * *